(12) United States Patent
Cheng et al.

(10) Patent No.: US 11,477,281 B2
(45) Date of Patent: Oct. 18, 2022

(54) DATA OBJECT DELIVERY FOR DISTRIBUTED CLUSTER COMPUTING

(71) Applicant: Citrix Systems, Inc., Fort Lauderdale, FL (US)

(72) Inventors: Zhuzhang Cheng, Santa Clara, CA (US); Jungang Wei, Santa Clara, CA (US); Pei Wang, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/155,694

(22) Filed: Jan. 22, 2021

(65) Prior Publication Data

US 2022/0191277 A1    Jun. 16, 2022

Related U.S. Application Data

(63) Continuation of application No. PCT/CN2020/135584, filed on Dec. 11, 2020.

(51) Int. Cl.
| | |
|---|---|
| G06F 9/48 | (2006.01) |
| H04L 67/1097 | (2022.01) |
| G06F 9/30 | (2018.01) |
| H04L 67/01 | (2022.01) |
| H04L 67/561 | (2022.01) |

(52) U.S. Cl.
CPC ...... *H04L 67/1097* (2013.01); *G06F 9/30076* (2013.01); *G06F 9/4806* (2013.01); *H04L 67/01* (2022.05); *H04L 67/561* (2022.05)

(58) Field of Classification Search
CPC . H04L 67/1097; H04L 67/2804; H04L 67/42; G06F 9/30076; G06F 9/4806
See application file for complete search history.

(56) References Cited

U.S. PATENT DOCUMENTS

| | | | | |
|---|---|---|---|---|
| 7,526,527 | B1* | 4/2009 | Woodruff | H04L 29/12584 709/212 |
| 10,558,664 | B2 | 2/2020 | Armbrust et al. | |
| 10,769,130 | B1 | 9/2020 | Armbrust et al. | |
| 11,055,055 | B1* | 7/2021 | Fieldman | G06F 9/451 |
| 2016/0373302 | A1* | 12/2016 | Sigoure | H04L 41/046 |

(Continued)

OTHER PUBLICATIONS

Amster, Ari, "Top Apache Use Cases | Qubole," Mar. 10, 2016, updated Nov. 10, 2020, http://www.quebole.com/blog/apache-spark-use-cases/, 10 pages.

(Continued)

*Primary Examiner* — Viet D Vu
(74) *Attorney, Agent, or Firm* — Banner & Witcoff, Ltd.

(57) ABSTRACT

Methods and systems for delivering data for cluster computing are described herein. A worker device may receive a dataset and store the dataset in a local storage media. This may prevent the need for the dataset to be sent over a network each time the applications are used to perform a task. Each application may be able to access the dataset in the local storage area. This may prevent the need to copy the dataset to memory associated with each application. A worker device may store a dataset, for example, if it determines that the frequency of updates to the dataset satisfy a threshold. The worker device may receive updates to the dataset via a messaging system and may store the updated data in the local storage media.

17 Claims, 8 Drawing Sheets

(56) References Cited

U.S. PATENT DOCUMENTS

2017/0063965 A1   3/2017  Grenader
2017/0109238 A1*  4/2017  Blea .................... G06F 11/1448
2017/0169097 A1   6/2017  Petri et al.
2018/0004828 A1*  1/2018  Kathuria ................. H04L 67/26

OTHER PUBLICATIONS

"Kafka versus RabbitMQ," Philippe Dobbelaere et al., Distributed and Event-Based Systems, ACM, (Jun. 8, 2017), pp. 227-238.
Anonymous: "Producer-consumer problem—Wikipedia", Nov. 27, 2020, https://en.wikipedia.org/w/index.php?tile=Producer-consumer_problem&oldid=990956957, retrieved May 14, 2021.
May 2, 20216—(PCT\CN) ISR & WO—App 2020135584.

\* cited by examiner

US 11,477,281 B2

DATA OBJECT DELIVERY FOR DISTRIBUTED CLUSTER COMPUTING

CROSS-REFERENCE TO RELATED APPLICATION

This application is a continuation of PCT Application No. PCT/CN2020/135584, filed on Dec. 11, 2020, and entitled "Data Object Delivery For Distributed Cluster Computing". The above-mentioned application is incorporated herein by reference in its entirety and for all purposes.

FIELD

Aspects described herein generally relate to computer networking, remote computer access, virtualization, and hardware and software related thereto. More specifically, one or more aspects described herein provide data for use in cluster computing.

BACKGROUND

Big data applications may run on a cluster of servers and may handle large amounts of data. Distributed cluster-computing frameworks may use a cluster comprising a plurality of computing devices to perform a task. The cluster may comprise a master device and one or more worker devices that communicate with each other via a network. The master device may store a dataset. To perform a task, the master device may send the dataset to each worker device in the cluster.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To perform a task using a cluster, a dataset may be sent to one or more worker devices in the cluster. A worker device may connect to remote data stores or databases to retrieve the dataset and may copy the dataset across multiple applications executing on the worker device. When computation is done or an application ceases execution, the data may be discarded. If a dataset is large, the time used for broadcasting the dataset, memory used to store the dataset, and/or the volume of data transferred over network, by every application on the servers may be significant. Furthermore, the memory used by each application may be private to each application. As a result the overall memory usage may be multiplied by the number of applications that need the dataset. If a database or another remote service is used, the application's performance may be decreased due to delays (e.g., latency) incurred from sending requests and receiving responses to the database.

According to aspects described herein, a worker device may receive a dataset and store the dataset in a local storage media. This may prevent the need for the dataset to be sent over a network each time the applications are used to perform a task. Each application may be able to access the dataset in the local storage area. This may prevent the need to copy the dataset to memory associated with each application. A worker device may store a dataset, for example, if it determines that the frequency of updates to the dataset satisfy a threshold. The worker device may receive updates to the dataset via a messaging system and may store the updated data in the local storage media. The worker device may receive no-op messages periodically. A no-op message may indicate that there are no updates to the dataset.

In one aspect, a computer implemented method may include subscribing, by a worker device of a cluster, to a dataset; receiving, via a first process executing on the worker device and from a master device of the cluster, the dataset; storing the dataset on a local storage media of the worker device; executing, via one or more processes different from the first process, a plurality of applications to perform a task on the dataset, wherein each application of the plurality of applications is configured to share, with each other application of the plurality of applications, the dataset from the local storage media; receiving, based on the subscribing and from the master device, a data update message indicating a change to the dataset; and updating, based on the data update message, the dataset on the local storage media.

The method may further include ceasing, based on a determination that a no-op message has not been received within a threshold time period, execution of the plurality of applications. The no-op message may indicate that there have been no updates to the dataset. The storing the dataset may comprise determining, based on metadata associated with the dataset, that a quantity of updates to the dataset within a time period satisfy a threshold; and based on the determining that the quantity of updates satisfies the threshold, storing the dataset in the local storage media. The storing the dataset may comprise determining, based on metadata associated with the dataset, that a size of the dataset satisfies a threshold; and based on the determining that the size of the dataset satisfies the threshold, storing the dataset in the local storage media.

The method may further include receiving, via the first process and during execution of the plurality of applications, a message comprising an update to the dataset; and updating, via the first process, the dataset in the local storage media. The local storage media may include a solid-state drive. The executing the plurality of applications may include joining the dataset from the local storage media with a second dataset received from the master device.

In some aspects, a system may be configured to perform one or more aspects and/or methods described herein. In some aspects, an apparatus may be configured to perform one or more aspects and/or methods described herein. In some aspects, one or more computer readable media may store computer executed instructions that, when executed, configure a system to perform one or more aspects and/or methods described herein. These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
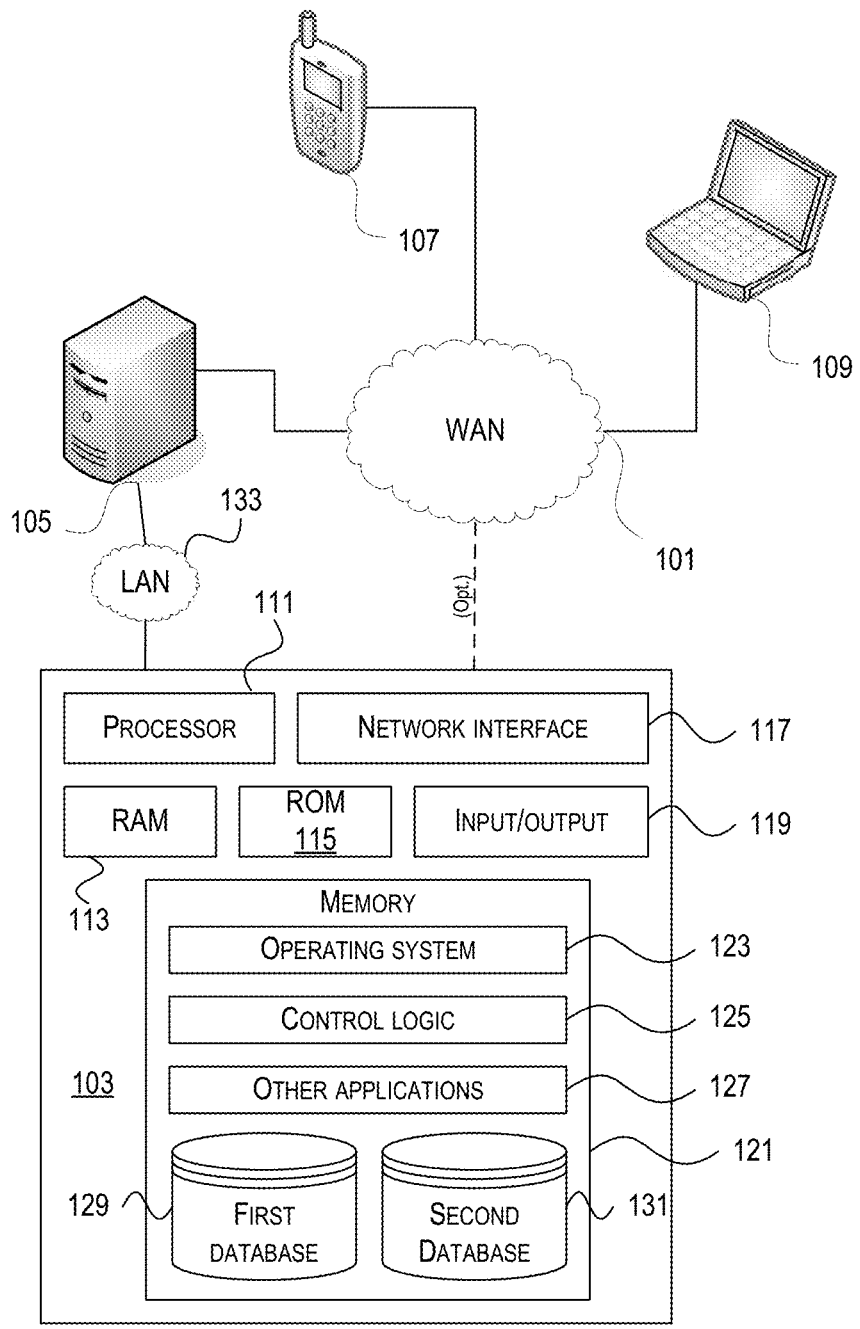
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
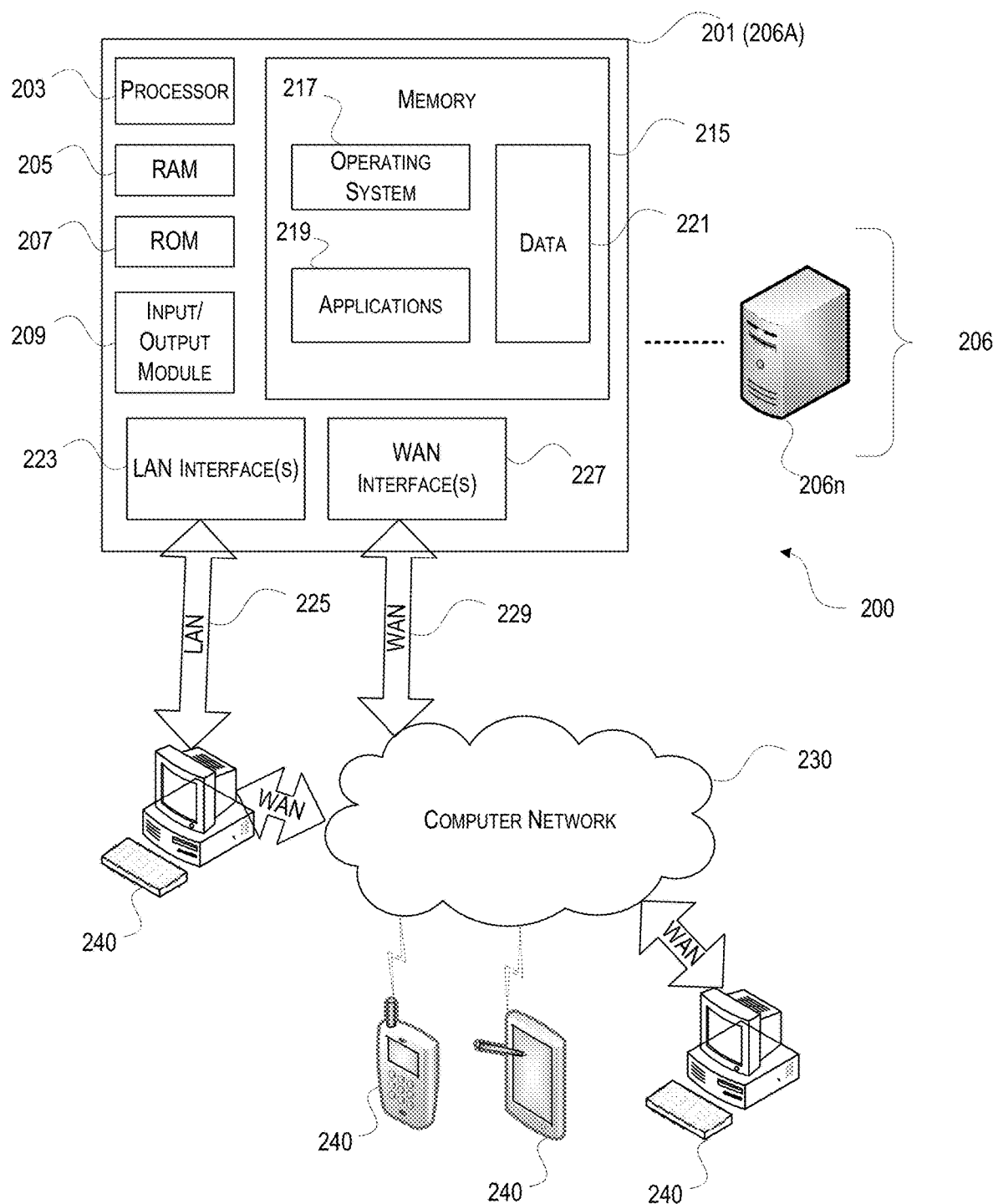
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
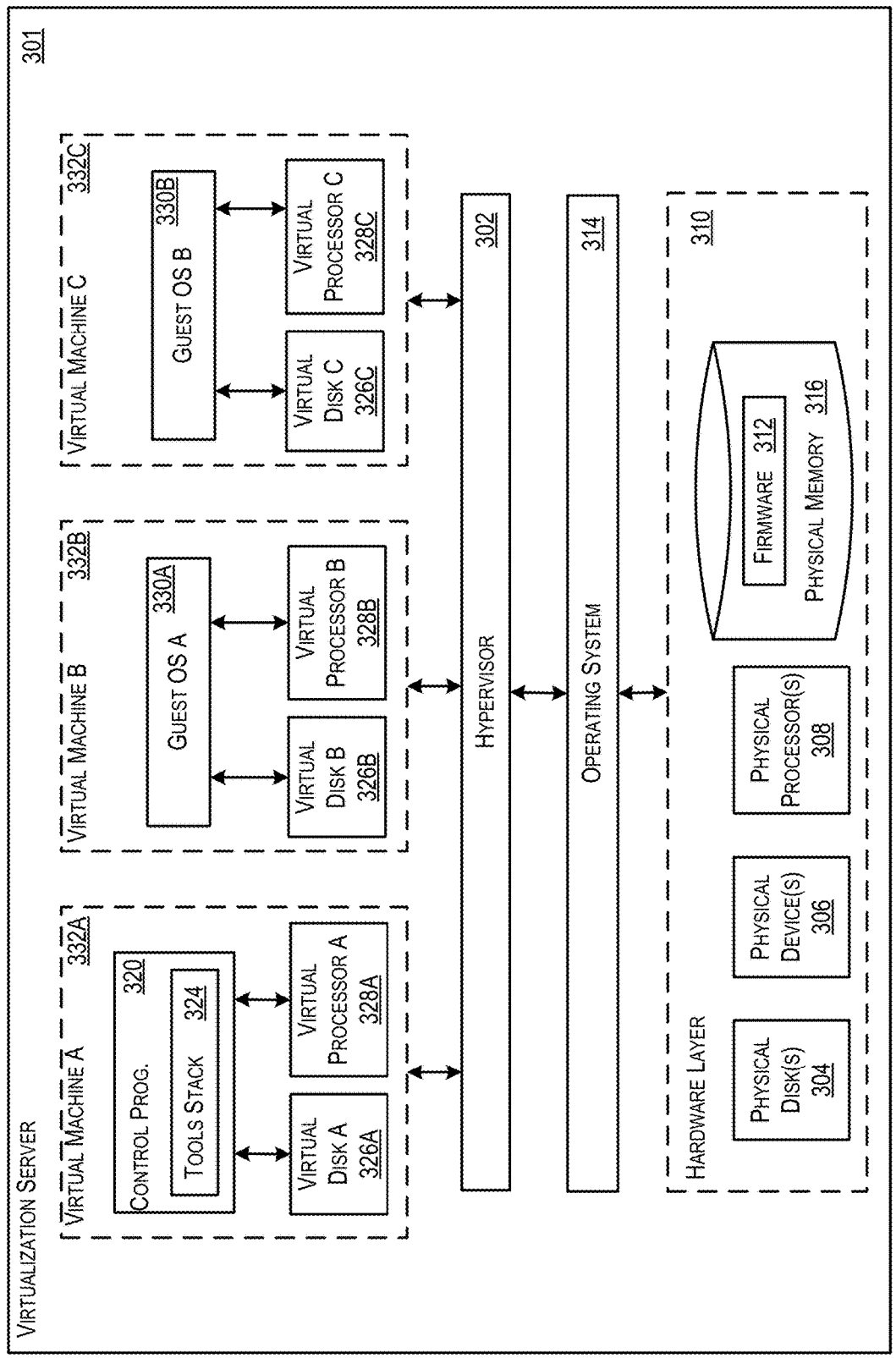
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
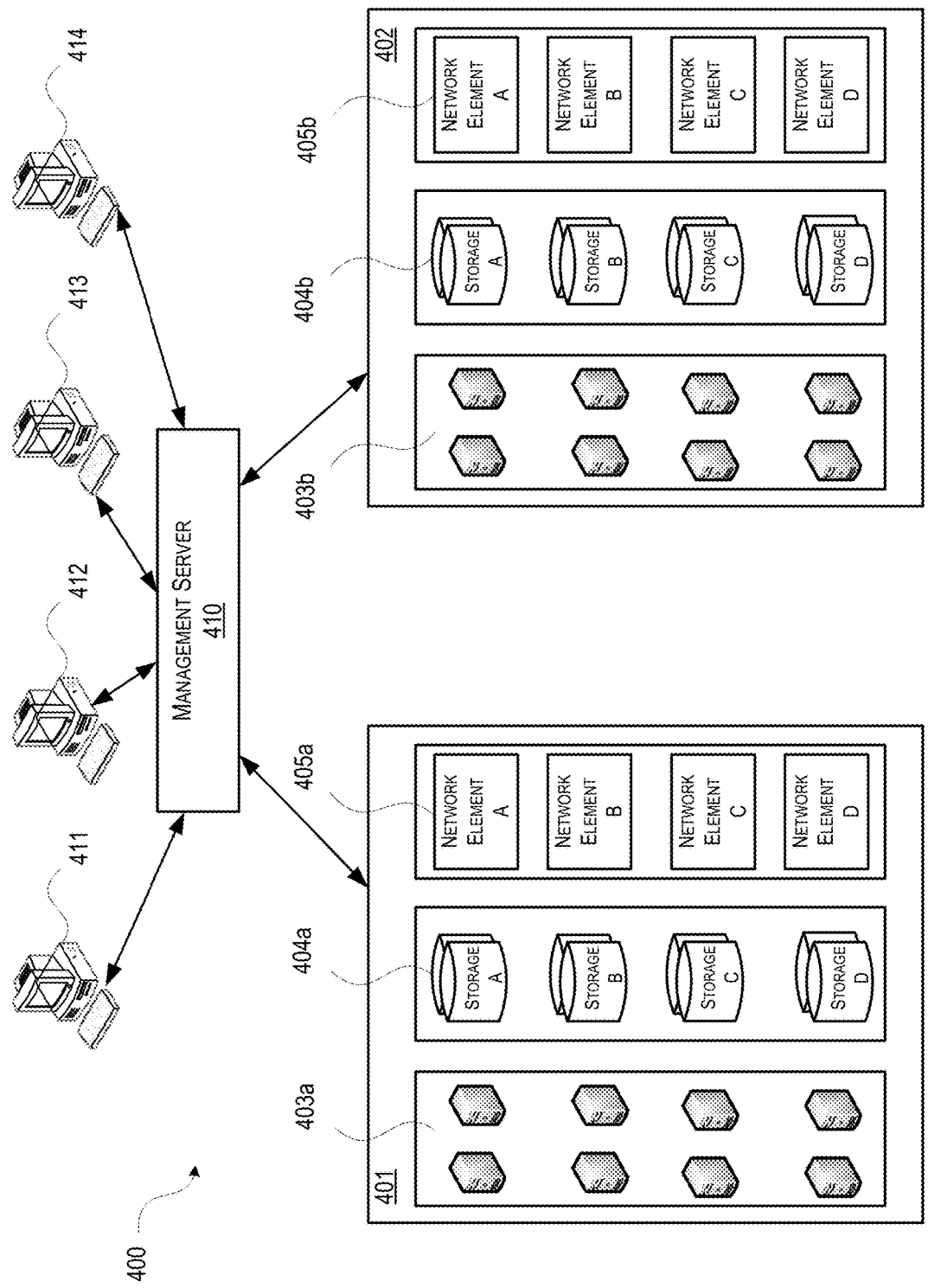
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Wash.), IBM BLUE CLOUD (IBM Corporation of Armonk, N.Y.), or others.

Data Object Delivery for Cluster-Computing

Figure 5:
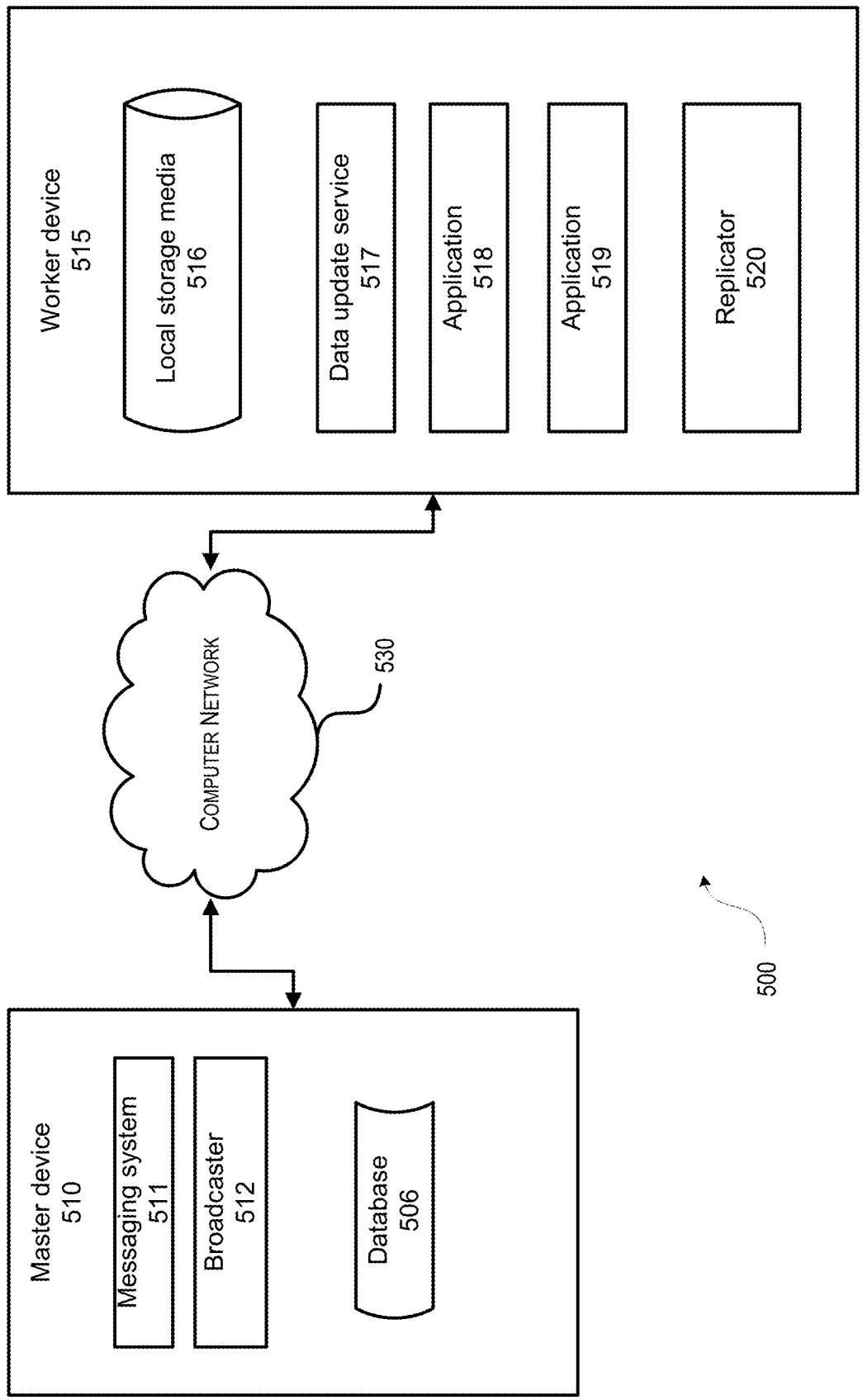
FIG. 5 depicts an illustrative cluster computing system that may be used in accordance with one or more illustrative aspects described herein.

FIG. 5 shows an example cluster computing system 500. The cluster computing system 500 may comprise a master device 510, a worker device 515, and a computer network 530. The cluster computing system 500 may comprise any component or device described in connection with FIGS. 1-4. For example, the master device 510 may comprise the management server 410. The worker device 515 may comprise one or more of the client computers 411-414. The master device 510 may be configured to communicate with the worker device 515 via a computer network 530. Although only one worker device is shown in the cluster computing system 500, the system 500 may comprise any number of worker devices (e.g., 5, 100, 5000, etc.). The worker devices may be duplicates of or similar to the worker device 515, and may be configured to operate in the same or a similar manner. As discussed in more detail below, the worker device 515 may be configured to store datasets (e.g., datasets received from the master device 510) in one or more local storage media. This may improve the efficiency of the cluster computing system 500 by reducing the need to transfer large datasets over the network 530 each time the cluster computing system 500 is used to perform a task.

The master device 510 may store datasets used by the cluster computing system 500. The master device 510 may send one or more datasets to one or more worker devices (e.g., the worker device 515), to enable the worker devices to perform a task (e.g., data enrichment, machine learning, or any other task) using the one or more datasets. The master device 510 may comprise a messaging system 511, a broadcaster 512, and/or a database 506, any of which may be implemented in software and/or hardware. The broadcaster 512 may be configured to send datasets to each worker device in the cluster computing system 500. For example, the broadcaster 512 may be configured to send a snapshot of a dataset to the worker device 515. A snapshot may comprise a set of reference markers for data at a point in time. A snapshot may be used to recreate a dataset and may allow the worker device 515 to create a dataset. The broadcaster 512 may generate a snapshot indicating a collection of data objects. The snapshot may be generated periodically based on data objects in a centralized data store, database, or other data sources.

The messaging system 511 may be configured to send messages to the worker device 515 to enable the worker device to store datasets. A message may comprise updates to a dataset. Additionally or alternatively, a message may comprise a location (e.g., a URI) of a dataset. The messaging system 511 may encode a dataset into a series of messages. For example, each message in the series may comprise a portion of the dataset. The messaging system 511 may generate different types of messages. For example, one message type may indicate that a message is part of a series of messages that together comprise a full dataset. A different message type may indicate that a message comprises an update to an existing dataset stored at the worker device 515. For example, a message comprising an update may indicate a change (e.g., adding data and/or removing data) to a dataset. The message may comprise the data that should be added and/or the data that should be removed from the dataset. A message type may indicate that the message comprises the location of a snapshot of a dataset.

The worker device 515 may be configured to perform a task (e.g., as instructed by the master device 510). The worker device 515 may receive, from the master device 510, one or more datasets that may be used to perform the task. The worker device 515 may subscribe to one or more datasets. Subscribing to a dataset may cause the worker device 515 to receive the dataset and any subsequent data update messages from the master device 510. The worker device 515 may comprise a local storage drive 516, a data update service 517, and/or a replicator 520. The worker device 515 may be configured to execute one or more applications (e.g., an application 518 and/or an application 519). Although only two applications 518-519 are shown in FIG. 5, the worker device 515 may be configured to execute any number (e.g., 5, 50, 1000, etc.) of applications to perform a task. The applications may comprise a virtual disk and/or a virtual processor (e.g., a virtual disk 326A-C and a virtual processor 328A-C as described in connection with FIG. 3 above). An application (e.g., the application 518 and/or the application 519) may execute, using a virtual processor (e.g., the virtual processor 328A as described above in connection with FIG. 3 above), and/or a control program (e.g., the control program 320 that includes a tools stack 324 as described above in connection with FIG. 3).

The data update service 517 may subscribe to the messaging system 511 to receive updates for datasets. The data update service 517 may receive messages from the messaging system 511 to update the dataset. The data update service 517 may receive datasets from the broadcaster 512. A dataset stored on the local storage media 516 may be updated based on the messages received from the messaging system 511. The data update service 517 may compare data updates and/or datasets received with data in the local storage media 516 (e.g., to check for errors, inconsistencies, etc.). For example, after receiving message comprising a snapshot, the data update service 517 may compare the snapshot with the dataset stored on the local storage media 516. If any errors are found, the data update service 517 may report them to the master device 510. Additionally or alternatively, the data update service 517 may cause the worker device 515 to cease execution of one or more applications (e.g., applications 518-519), for example, if any errors and/or inconsistencies with the dataset are found. The data update service 517 may be configured to build or rebuild a dataset using a snapshot of the dataset received from the master device 510.

The data update service 517 may communicate periodically with the messaging system 511. The data update service 517 may expect to receive a message periodically or within a threshold period of time (e.g., every 500 ms, 3 seconds, 1 minute, etc.). For example, if there are no updates, the messaging system 511 may send a message (e.g., a no-op message) indicating that there are no changes to the dataset stored on the local storage media 516. If a message is not received from the messaging system 511 within the threshold period of time, the worker device 515 may cease execution of one or more applications (e.g., the application 518-519). If the message is not received, it may mean that there is an error with the master device 510 and/or with the computer network The worker device 515 may cease execution of the one or more applications to prevent errors that may arise due to its inability to communicate with the master device 510 and/or any inconsistencies that exist with one or more datasets used by the applications 518-519.

The local storage media 516 may store one or more datasets that the worker device 515 may use to complete a task. The local storage media 516 may be any type of storage media (e.g., solid-state drive, disk drive, etc.). The local storage media 516 may comprise a key-value store. The applications 518-519 may use remote procedure calls (RPC) within the worker device 515 (e.g., locally) to retrieve data from the local storage media 516. The replicator 520 may be configured to retrieve one or more datasets from the local storage media 516 and may send the one or more datasets or a portion of the one or more datasets to the applications 518-519 for use in a task.

Aspects of the cluster computing system 500 described herein may improve cluster-computing application performance by eliminating repeated broadcasting of datasets. The system 500 may reduce memory usage of applications executed by the system 500 (e.g., executed by the worker device 515) because instead of copying the dataset to memory associated with each application, each application may share the dataset stored in the local storage media 516. Aspects described herein may reduce the cost of running the applications. Aspects described herein may make memory usage of the worker device 515 and/or system 500 more predictable when joining datasets (e.g., combining two or more datasets).

Figure 6:
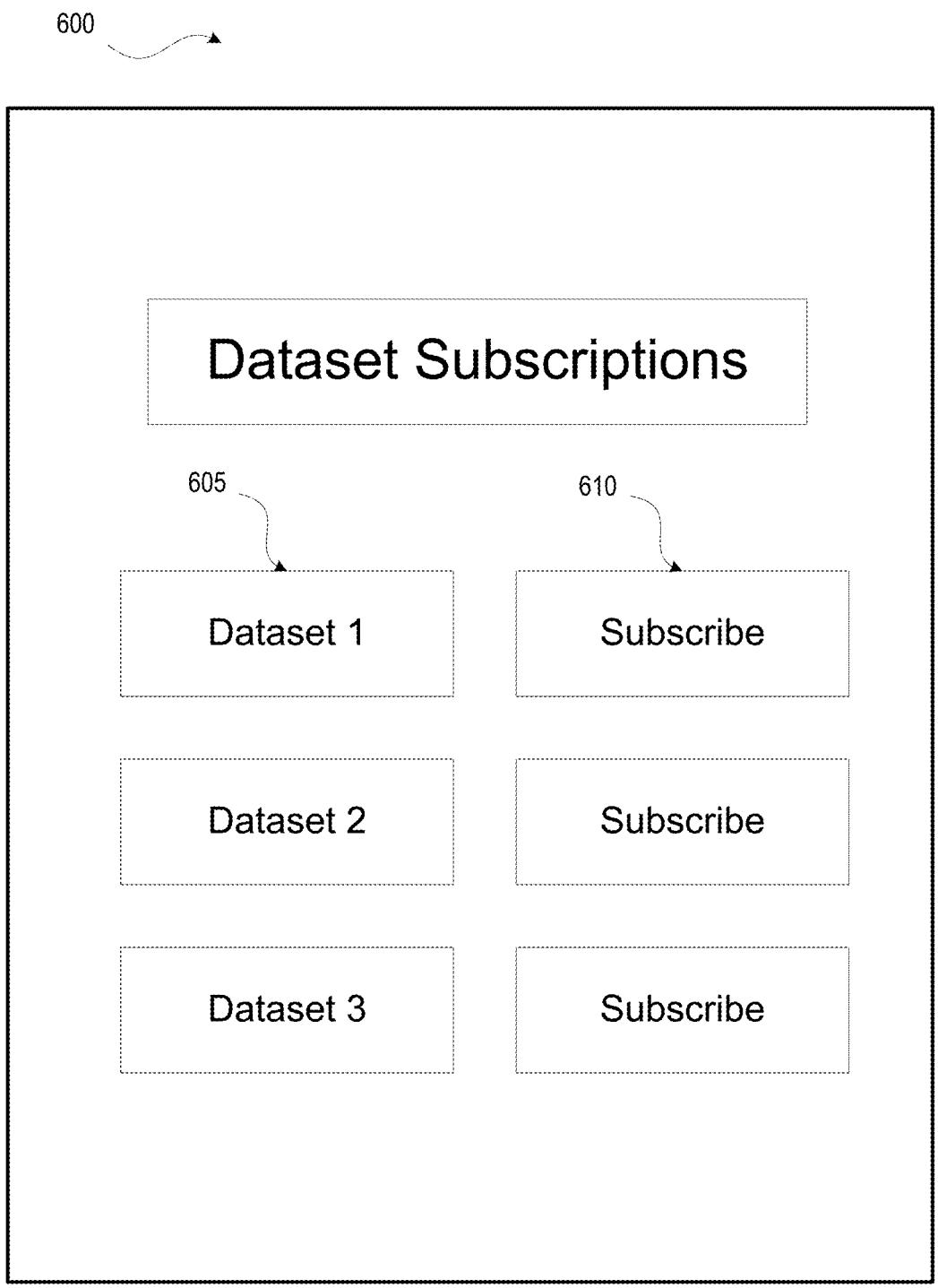
FIG. 6 depicts an illustrative dataset subscription user interface that may be used in accordance with one or more illustrative aspects described herein.

FIG. 6 shows an example user interface 600 that may be used to subscribe to a dataset. A user may use the user interface to cause one or more worker devices (e.g., the worker device 515) to subscribe to a dataset. As described above in connection with FIG. 5, by subscribing to a dataset, the worker device 515 may receive, from the master device 510, messages that update a dataset stored in the local storage media 516 of the worker device 515. The user interface 600 may comprise one or more elements 605 indicating datasets to which the worker device 515 may subscribe. The user interface may comprise one or more elements 610 that may correspond to one or more datasets. By interacting with the one or more elements 610, a user may cause the worker device 515 to subscribe to an associated dataset.

Figure 7:
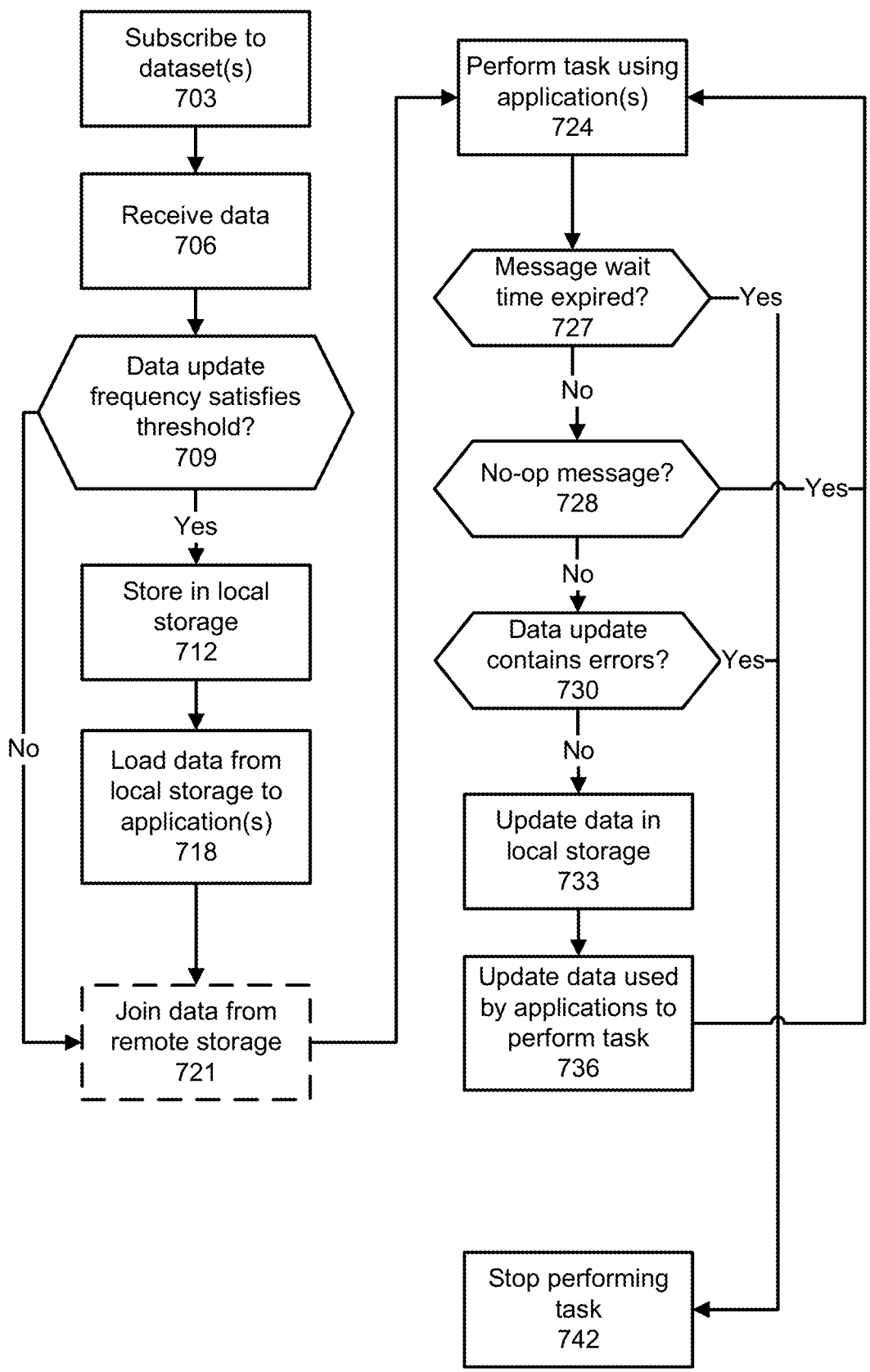
FIG. 7 depicts an illustrative method for providing data to a distributed cluster that may be used in accordance with one or more illustrative aspects described herein.

A worker device of a cluster may store one or more datasets on local storage media. This may reduce the need for a master device of the cluster to send large datasets over a network to the worker device each time a task is performed by the cluster. FIG. 7 shows an example method for delivering data to a cluster computing system. The example method may be performed using any device or component described in connection with FIGS. 1-6. Although one or more steps of FIG. 7 are described for convenience as being performed by the master device 510 or the worker device 515, one, some, or all of such steps may be performed by the management server 410, client computers 411-414, zones 401-402, or one or more other computing devices, and steps may be distributed among one or more computing devices, including any computing devices such as those described in connection with FIGS. 1-6. One or more steps of FIG. 7 may be rearranged, modified, repeated, and/or omitted.

At step 703, the worker device 515 may subscribe to one or more datasets. The worker device 515 may send a request to the master device 510 to subscribe to a dataset. The request may comprise an identification of one or more datasets to which the worker device 515 requests subscription.

At step 706, the worker device 515 may receive data corresponding to the dataset subscribed to in step 703. For example, the worker device 515 may receive a series of messages comprising the dataset. Additionally or alternatively, the worker device 515 may receive a message indicating a storage location where a snapshot of the dataset is stored (e.g., on the master device 510, or other location). The worker device 515 may retrieve (e.g., via the computer network 530) the dataset from the indicated location.

At step 709, the worker device 515 may determine whether a data update frequency satisfies a threshold. The worker device 515 may be configured to store datasets that change less frequently than other datasets. A dataset that changes less often may require less messages to be sent over the computer network 230 to keep the dataset up to date. The cluster computing system 500 may experience a greater improvement in efficiency (e.g., less bandwidth usage), for example, if datasets that change infrequently are stored at one or more worker devices of the system 500.

The dataset received in step 706 may comprise metadata indicating how often the dataset is updated. The worker device 515 may use the metadata to determine whether a data update frequency satisfies a threshold (e.g., whether the data update frequency of the dataset is below the threshold). The metadata may comprise a history of each update or change to the dataset. For example, the history may comprise a list of dates when the dataset was changed. Additionally or alternatively, the metadata may indicate a list of updates and a volume of data (e.g., megabytes, gigabytes, terabytes, petabytes, etc.) that was changed in each update. The worker device 515 may determine, based on the metadata, whether a data update frequency satisfies a threshold. For example, if the data is updated less than a threshold quantity of times in a time period (e.g., less than 10 times per day, less than once per month, etc.), the worker device may determine that the update frequency threshold is satisfied. Additionally or alternatively, the worker device 515 may determine, based on the metadata, whether a change in volume within a time period satisfies a threshold. For example, the worker device 515 may determine whether a threshold volume has changed in a time period (e.g., there has been less than 10 gigabytes of changes to the dataset within two days, or any other volume/time period). Step 712 may be performed if the worker device 515 determines that the data update frequency satisfies the threshold. Otherwise, step 721 may be performed.

At step 712, the worker device 515 may store the data received in step 706 in the local storage media 516. If the update frequency (e.g., in terms of volume and/or quantity of updates) satisfies the threshold, the worker device 712 may store the dataset in the local storage media 516. The worker device 515 may reduce traffic on the computer network 530 by reducing the need to receive datasets from the master device 510 each time a task is performed using the cluster computing system 500. It may benefit the system 500, for example, if worker devices store datasets locally so that the datasets do not need to be sent over a network each time a task is performed.

At step 718, the worker device may copy a dataset from the local storage media 516 to memory associated with one or more applications. The dataset may be shared by one or more applications executing on the worker device 515. For example, applications 518-519 may share the dataset stored in local storage in step 712. Each application may access portions of the dataset from the local storage media 516 and may store it in partitioned memory. The worker device 515 may use less memory for the dataset because instead of having to copy the dataset to each application, the applications may share the dataset.

At step 721, the worker device 515 may optionally join a dataset from remote storage with the dataset copied in step 718. The task performed by the worker device 515 may require additional data beyond the dataset stored in the local storage media 516. The worker device 515 may receive the additional data from the master device 510 and may join or otherwise combine it with the data copied in step 718.

At step 724, the worker device 515 may perform a task using one or more applications (e.g., the applications 518-519). The worker device may perform any task assigned by the master device 510 or any task that may be performed by a cluster computing system. For example, the worker device 515 may perform streaming ETL (extract, transform, load), data enrichment, machine learning, or any other task.

At step 727, the worker device 515 may determine whether a wait time to receive a message has expired. The worker device 515 may expect to receive a message (e.g., a data update message or a no-op message) from the master device 510 periodically and/or within a threshold period of time. For example, the threshold period of time may be 50 milliseconds, 500 milliseconds, 1 second, 1 minute, or any other period of time. Receiving a message within the threshold period of time may indicate that the worker device 515 may continue performing the task described above in connection with step 724. If the wait time (e.g., the threshold period of time) has expired without the worker device 515 receiving a message, step 742 may be performed. Otherwise, step 728 may be performed.

At step 728, the worker device 515 may determine whether the message received in step 727 is a no-op message. A no-op message may indicate that there have been no changes to the data used to perform the task in step 724 and/or no changes to the data stored in the local storage media 516. The no-op message may indicate that the worker device 515 is using the most up to date version of the dataset. If there are no updates to the data used by the applications 518-519, the worker device 515 may expect to receive a no-op message from the master device 510 periodically and/or within a threshold period of time (e.g., the threshold period of time or wait time described above in connection with step 727). Receiving the no-op message within the threshold period of time may indicate that the worker device 515 may continue performing the task described above in connection with step 724.

Additionally or alternatively, the worker device 515 may determine whether the message received is a data update message (e.g., if the message received in step 727 is not a no-op message then it may be a data update message). The data update message may indicate a change in data that is being used by the worker device 515 to perform the task in step 724 and/or data that is stored in local storage 712. The data update message may indicate data that should be added to a dataset. Additionally or alternatively, the data update message may indicate data that should be removed from the dataset. If the worker device 515 determines that the message was not a no-op message, step 730 may be performed. Otherwise (e.g., the message received in step 727 was a no-op message), the worker device 515 may continue performing the task described above in connection with step 724.

At step 730, the worker device 515 may determine whether the data update message comprises any errors. The worker device 515 may compare data indicated by the update message with data stored in the local storage media 516 to determine whether there are any inconsistencies. The worker device 515 may send a message to the master device 510 to notify the master device 510 of the error. If the worker device 515 determines that the data update message comprises errors, step 742 may be performed. If the worker device 515 determines that the data update message does not contain errors step 733 may be performed.

At step 733, the worker device 515 may update data in in the local storage media 516 based on the data update message received in step 727. The worker device 515 may add new data and/or remove data from the local storage media 516. At step 736, the worker device may update data used by the applications to perform the task in step 724. The applications (e.g., applications 518-519) may access the local storage device 516 to access the updated data. The worker device 515 may continue to perform the task described in connection with step 724.

Step 742 may be performed, for example, if the wait time (e.g., the threshold period of time) has expired in step 727, or if the data update contains errors (as described in connection with step 730). At step 742, the worker device 515 may stop performing the task from step 724. The worker device 515 may stop performing the task to prevent any errors that may arise due to an inability to receive data update messages from the master device 510 and/or otherwise communicate with the master device 510. Additionally or alternatively, the worker device 515 may stop performing the task because the data (e.g., in the data update message) contains errors. The worker device may 515 restart or continue the task when a no-op message or other message is received from the master device 510.

Figure 8:
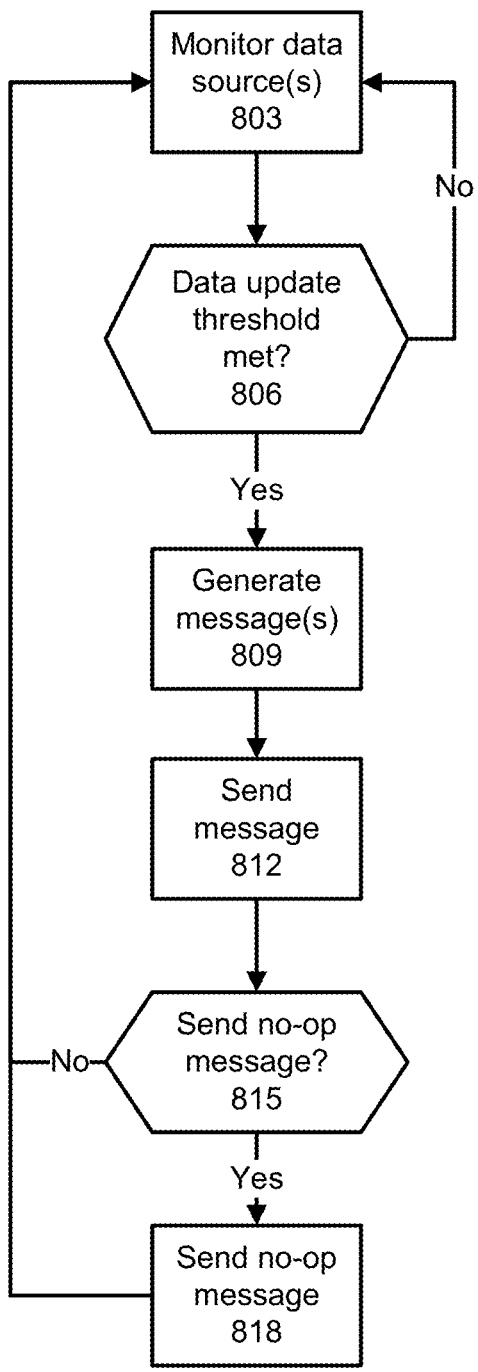
FIG. 8 depicts an illustrative method for providing data to a distributed cluster that may be used in accordance with one or more illustrative aspects described herein.

A master device of a cluster computing system may be configured to provide data to one or more worker devices of the cluster. The master device may use a messaging system to send datasets and/or updates to datasets to the one or more worker devices. The worker devices may store the datasets on a local storage media to prevent the need to send the datasets each time a task is performed by the cluster computing system. FIG. 8 shows an example method for providing data for a cluster computing system. The example method may be performed using any device or component described in connection with FIGS. 1-7. Although one or more steps of FIG. 8 are described for convenience as being performed by the master device 510 and/or the worker device 515, one, some, or all of such steps may be performed by the management server 410, client computers 411-414, zones 401-402, or one or more other computing devices, and steps may be distributed among one or more computing devices, including any computing devices such as those described in connection with FIGS. 1-7. One or more steps of FIG. 8 may be rearranged, modified, repeated, and/or omitted.

At step 803, the master device 510 may monitor one or more data sources. The master device 510 may monitor data sources that are external to the cluster computing system 500 and may store data to be used by the cluster computing system. The master device 510 may record changes to any datasets stored by the master computing device 510 and may receive updates to the dataset.

At step 806, the master device 510 may determine whether an update threshold has been met. The master device 510 may be configured to share data with the one or more worker devices (e.g., the worker device 515). The master device 510 may wait to send updates to the worker devices until a threshold amount of data has changed in the datasets. For example, the master device 510 may avoid sending an update if less than a threshold volume of data in the dataset has changed (e.g., less than 1 megabyte, 500 gigabytes, or any other volume of data). If it is determined that the data update threshold has been met, step 809 may be performed. Otherwise, the master device 510 may continue to monitor the one or more data sources as explained above in connection with step 803.

At step 809, the master device 510 (e.g., the messaging system 511) may generate one or more messages. The one or more messages may comprise a dataset or an update to a dataset as described above in connection with FIG. 5. The master device 510 may generate messages based on restart requirements of the messaging system 511 and/or fault tolerant requirements. For example, the messages may be sent based on a first threshold period of time indicating the maximum permitted time between two messages. For example, if the first threshold period of time is five seconds, the master device 510 may be configured to send a message (e.g., a no-op message when no change is made during the period of time) every five seconds. If the worker device 515 does not receive a message within a pre-defined time (e.g., a second threshold time (e.g., 15 seconds, or some other period of time that is greater than the first threshold period of time)), the worker device 515 may determine that it has lost communication with the master device 510. The worker device 515 may have lost communication with the master device 510 because the master device 510 may have shut down or experienced a fault (e.g., an error). Additionally or alternatively, the worker device 515 may have lost communication with the master device 510 due to networking issues. At step 812, the master device may send the message generated in step 809 to one or more worker devices (e.g., the worker device 515).

At step 815, the master device 510 may determine whether to send a no-op message. The master device 510 may send a no-op message periodically to the one or more worker devices to indicate that there have been no updates to data. After a threshold period of time has expired, the master device 510 may send a no-op message. For example, the master device 510 may determine to send a no-op message once every 50 milliseconds, 500 milliseconds, 1 second, 1 minute, or any other period of time. If the master device 510 determines to not send a no-op message, the master device may continue to monitor one or more data sources in step 803. If the master device 510 determines that a no-op message should be sent, step 818 may be performed. At step 818, the master device 510 may send a no-op message to one or more worker devices (e.g., the worker device 515).

The following paragraphs (M1) through (M8) describe examples of methods that may be implemented in accordance with the present disclosure.

(M1) A method comprising subscribing, by a worker device of a cluster, to a dataset; receiving, via a first process executing on the worker device and from a master device of the cluster, the dataset; storing the dataset on a local storage media of the worker device; executing, via one or more processes different from the first process, a plurality of applications to perform a task on the dataset, wherein each application of the plurality of applications is configured to share, with each other application of the plurality of applications, the dataset from the local storage media; receiving, based on the subscribing and from the master device, a data update message indicating a change to the dataset; and updating, based on the data update message, the dataset on the local storage media.

(M2) A method may be performed as described in paragraph (M1), further comprising: ceasing, based on a determination that a no-op message has not been received within a threshold time period, execution of the plurality of applications.

(M3) A method may be performed as described in any one of paragraphs (M1)-(M2), wherein the no-op message indicates that there have been no updates to the dataset.

(M4) A method may be performed as described in any one of paragraphs (M1)-(M3), wherein the storing the dataset comprises: determining, based on metadata associated with the dataset, that a quantity of updates to the dataset within a time period satisfy a threshold; and based on the determining that the quantity of updates satisfies the threshold, storing the dataset in the local storage media.

(M5) A method may be performed as described in any one of paragraphs (M1)-(M4), wherein the storing the dataset comprises: determining, based on metadata associated with the dataset, that a size of the dataset satisfies a threshold; and based on the determining that the size of the dataset satisfies the threshold, storing the dataset in the local storage media.

(M6) A method may be performed as described in any one of paragraphs (M1)-(M5), further comprising: receiving, via the first process and during execution of the plurality of applications, a message comprising an update to the dataset; and updating, via the first process, the dataset in the local storage media.

(M7) A method may be performed as described in any one of paragraphs (M1)-(M6), wherein the local storage media comprises a solid-state drive.

(M8) A method may be performed as described in any one of paragraphs (M1)-(M8), wherein the executing the plurality of applications comprises joining the dataset from the local storage media with a second dataset received from the master device.

The following paragraphs (A1) through (A8) describe examples of apparatuses that may be implemented in accordance with the present disclosure.

(A1) A worker device comprising: at least one processor; and memory storing computer-readable instructions that, when executed by the at least one processor, cause the worker device to: subscribe to a dataset; receive, via a first process executing on the worker device and from a master device, the dataset; store the dataset on a local storage media of the worker device; execute, via one or more processes different from the first process, a plurality of applications to perform a task on the dataset, wherein each application of the plurality of applications is configured to share, with each other application of the plurality of applications, the dataset from the local storage media; receive, based on the subscribing and from the master device, a data update message indicating a change to the dataset; and update, based on the data update message, the dataset on the local storage media.

(A2) An apparatus as described in paragraph (A1), wherein the computer-readable instructions that, when executed by the at least one processor, cause the worker device to: cease, based on a determination that a no-op message has not been received within a threshold time period, execution of the plurality of applications.

(A3) An apparatus as described in any of paragraphs (A1)-(A2), wherein the no-op message indicates that there have been no updates to the dataset.

(A4) An apparatus as described in any of paragraphs (A1)-(A3), wherein the storing the dataset comprises: determining, based on metadata associated with the dataset, that a quantity of updates to the dataset within a time period satisfy a threshold; and based on the determining that the quantity of updates satisfies the threshold, storing the dataset in the local storage media.

(A5) An apparatus as described in any of paragraphs (A1)-(A4), wherein the storing the dataset comprises: determining, based on metadata associated with the dataset, that a size of the dataset satisfies a threshold; and based on the determining that the size of the dataset satisfies the threshold, storing the dataset in the local storage media.

(A6) An apparatus as described in any of paragraphs (A1)-(A5), wherein the computer-readable instructions that, when executed by the at least one processor, cause the worker device to: receive, via the first process and during execution of the plurality of applications, a message comprising an update to the dataset; and update, via the first process, the dataset in the local storage media.

(A7) An apparatus as described in any of paragraphs (A1)-(A6), wherein the local storage media comprises a solid-state drive.

(A8) An apparatus as described in any of paragraphs (A1)-(A7), wherein the executing the plurality of applications comprises joining the dataset from the local storage media with a second dataset received from the master device.

The following paragraphs (S1) through (S8) describe examples of one or more systems that may be implemented in accordance with the present disclosure.

(S1) A cluster computing system comprising: a worker device and in communication with a master device; wherein the worker device is configured to: subscribe to a dataset; receive, via a first process executing on the worker device and from the master device, the dataset; store the dataset on a local storage media of the worker device; execute, via one or more processes different from the first process, a plurality of applications to perform a task on the dataset, wherein each application of the plurality of applications is configured to share, with each other application of the plurality of applications, the dataset from the local storage media; receive, based on the subscribing and from the master device, a data update message indicating a change to the dataset; and update, based on the data update message, the dataset on the local storage media.

(S2) A system as described in paragraph (S1), wherein the worker device is further configured to: cease, based on a determination that a no-op message has not been received within a threshold time period, execution of the plurality of applications.

(S3) A system as described in any of paragraphs (S1)-(S2), wherein the no-op message indicates that there have been no updates to the dataset.

(S4) A system as described in any of paragraphs (S1)-(S3), wherein the storing the dataset comprises: determining, based on metadata associated with the dataset, that a quantity of updates to the dataset within a time period satisfy a threshold; and based on the determining that the quantity of updates satisfies the threshold, storing the dataset in the local storage media.

(S5) A system as described in any of paragraphs (S1)-(S4), wherein the storing the dataset comprises: determining, based on metadata associated with the dataset, that a size of the dataset satisfies a threshold; and based on the determining that the size of the dataset satisfies the threshold, storing the dataset in the local storage media.

(S6) A system as described in any of paragraphs (S1)-(S5), wherein the worker device is further configured to: receive, via the first process and during execution of the plurality of applications, a message comprising an update to the dataset; and update, via the first process, the dataset in the local storage media.

(S7) A system as described in any of paragraphs (S1)-(S6), wherein the local storage media comprises a solid-state drive.

(S8) A system as described in any of paragraphs (S1)-(S7), wherein the executing the plurality of applications comprises joining the dataset from the local storage media with a second dataset received from the master device.

The following paragraphs (CRM1) through (CRMXX) describe examples of computer-readable media that may be implemented in accordance with the present disclosure.

(CRM1) A non-transitory machine-readable medium storing instructions, that when executed by one or more processors, cause the one or more processors to: subscribe, by a worker device, to a dataset; receive, via a first process executing on the worker device and from a master device, the dataset; store the dataset on a local storage media of the worker device; execute, via one or more processes different from the first process, a plurality of applications to perform a task on the dataset, wherein each application of the plurality of applications is configured to share, with each other application of the plurality of applications, the dataset from the local storage media; receive, based on the subscribing and from the master device, a data update message indicating a change to the dataset; and update, based on the data update message, the dataset on the local storage media.

(CRM2) A non-transitory machine-readable medium as described in paragraph (CRM1), wherein the instructions, when executed by the one or more processors, further cause the one or more processors to: cease, based on a determination that a no-op message has not been received within a threshold time period, execution of the plurality of applications.

(CRM3) A non-transitory machine-readable medium as described in any of paragraphs (CRM1)-(CRM2), wherein the no-op message indicates that there have been no updates to the dataset.

(CRM4) A non-transitory machine-readable medium as described in any of paragraphs (CRM1)-(CRM3), wherein the storing the dataset comprises: determining, based on metadata associated with the dataset, that a quantity of updates to the dataset within a time period satisfy a threshold; and based on the determining that the quantity of updates satisfies the threshold, storing the dataset in the local storage media.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   subscribing, by a worker device of a cluster, to a dataset;
   receiving, via a first process executing on the worker device and from a master device of the cluster, the dataset;
   storing the dataset on a local storage media of the worker device comprising:
      determining, based on metadata associated with the dataset, that a quantity of updates to the dataset within a time period satisfies a data update frequency threshold; and
      based on determining that the quantity of updates within the time period satisfies the data update frequency threshold, storing the dataset in the local storage media;
   executing, via one or more processes different from the first process, a plurality of applications to perform a task on the dataset, wherein each application of the plurality of applications is configured to share, with each other application of the plurality of applications, the dataset from the local storage media;
   receiving, based on the subscribing and from the master device, a data update message indicating a change to the dataset; and
   updating, based on the data update message, the dataset on the local storage media.

2. The method of claim 1, further comprising:
   ceasing, based on a determination that a no-op message has not been received within a threshold time period, execution of the plurality of applications.

3. The method of claim 2, wherein the no-op message indicates that there have been no updates to the dataset.

4. The method of claim 1, wherein the storing the dataset comprises:
   determining, based on metadata associated with the dataset, that a size of the dataset satisfies a threshold; and
   based on the determining that the size of the dataset satisfies the threshold, storing the dataset in the local storage media.

5. The method of claim 1, further comprising:
   receiving, via the first process and during execution of the plurality of applications, a message comprising an update to the dataset; and
   updating, via the first process, the dataset in the local storage media.

6. The method of claim 1, wherein the local storage media comprises a solid-state drive.

7. The method of claim 1, wherein the executing the plurality of applications comprises joining the dataset from the local storage media with a second dataset received from the master device.

8. A cluster computing system comprising:
   a worker device in communication with a master device;
   wherein the worker device is configured to:
      subscribe to a dataset;
      receive, via a first process executing on the worker device and from the master device, the dataset;
      store the dataset on a local storage media of the worker device;
      wherein the storing the dataset comprises:
         determining, based on metadata associated with the dataset, that a quantity of updates to the dataset with a time period satisfies a data update frequency threshold; and
         based on the determining that the quantity of updates within the time period satisfies the data update frequency threshold, storing the dataset in the local storage media;
      execute, via one or more processes different from the first process, a plurality of applications to perform a task on the dataset, wherein each application of the plurality of applications is configured to share, with each other application of the plurality of applications, the dataset from the local storage media;
      receive, based on the subscribing and from the master device, a data update message indicating a change to the dataset; and
      update, based on the data update message, the dataset on the local storage media.

9. The system of claim 8, wherein the worker device is further configured to:
   cease, based on a determination that a no-op message has not been received within a threshold time period, execution of the plurality of applications.

10. The system of claim 9, wherein the no-op message indicates that there have been no updates to the dataset.

11. The system of claim 8, wherein the storing the dataset comprises:
    determining, based on metadata associated with the dataset, that a size of the dataset satisfies a threshold; and
    based on the determining that the size of the dataset satisfies the threshold, storing the dataset in the local storage media.

12. The system of claim 8, wherein the worker device is further configured to:
    receive, via the first process and during execution of the plurality of applications, a message comprising an update to the dataset; and
    update, via the first process, the dataset in the local storage media.

13. The system of claim 8, wherein the local storage media comprises a solid-state drive.

14. The system of claim 8, wherein the executing the plurality of applications comprises joining the dataset from the local storage media with a second dataset received from the master device.

15. A non-transitory machine-readable medium storing instructions, that when executed by one or more processors, cause the one or more processors to:
    subscribe, by a worker device, to a dataset;
    receive, via a first process executing on the worker device and from a master device, the dataset;
    store the dataset on a local storage media of the worker device;
    wherein the storing the dataset comprises;
       determining based on metadata associated with the dataset, that a quantity of updates to the dataset within a time period satisfies a data update frequency threshold; and based on the determining that the quantity of updates within the time period satisfies the data update frequency threshold, store the dataset on a local storage media;

execute, via one or more processes different from the first process, a plurality of applications to perform a task on the dataset, wherein each application of the plurality of applications is configured to share, with each other application of the plurality of applications, the dataset from the local storage media;

receive, based on the subscribing and from the master device, a data update message indicating a change to the dataset; and update, based on the data update message, the dataset on the local storage media.

16. The non-transitory machine-readable medium of claim 15, wherein the instructions, when executed by the one or more processors, further cause the one or more processors to:

cease, based on a determination that a no-op message has not been received within a threshold time period, execution of the plurality of applications.

17. The non-transitory machine-readable medium of claim 16, wherein the no-op message indicates that there have been no updates to the dataset.

* * * * *